(12) United States Patent
Collins et al.

(10) Patent No.: US 10,477,049 B2
(45) Date of Patent: Nov. 12, 2019

(54) MEDIA EXPANSION COMPENSATED PRINT CONTENT

(71) Applicant: Hewlett-Packard Development Company, L.P., Houston, TX (US)

(72) Inventors: David C. Collins, Philomath, OR (US); Jason Hower, Corvallis, OR (US); Frank Perdicaro, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/752,850

(22) PCT Filed: Aug. 31, 2015

(86) PCT No.: PCT/US2015/047689
§ 371 (c)(1),
(2) Date: Feb. 14, 2018

(87) PCT Pub. No.: WO2017/039601
PCT Pub. Date: Mar. 9, 2017

(65) Prior Publication Data
US 2018/0309888 A1    Oct. 25, 2018

(51) Int. Cl.
*H04N 1/00* (2006.01)
*G06K 15/02* (2006.01)
*H04N 1/50* (2006.01)
*H04N 1/60* (2006.01)

(52) U.S. Cl.
CPC ....... *H04N 1/00649* (2013.01); *G06K 15/021* (2013.01); *G06K 15/1868* (2013.01); *G06K 15/1873* (2013.01); *H04N 1/0066* (2013.01); *H04N 1/00978* (2013.01); *H04N 1/506* (2013.01); *H04N 1/6097* (2013.01)

(58) Field of Classification Search
USPC ......................................... 358/1.2
See application file for complete search history.

(56) References Cited

U.S. PATENT DOCUMENTS

| 5,913,267 | A  | 6/1999 | Britsch |
| 7,777,915 | B2 | 8/2010 | Kuo et al. |
| 8,118,385 | B2 | 2/2012 | Van de Wynckel et al. |
| 8,842,331 | B1 | 9/2014 | Enge |
| 2005/0024661 | A1 | 2/2005 | Akashi |
| 2006/0072939 | A1 | 4/2006 | Kremer |

(Continued)

FOREIGN PATENT DOCUMENTS

EP    1681165    7/2016

OTHER PUBLICATIONS

5 Easy Fixes for Common Print Problems, Xerox Corp, May 27, 2010. 2 pages. Available online: http://www.office.xerox.com/latest/XOGFL-40U.pdf.

*Primary Examiner* — Frantz Bataille
(74) *Attorney, Agent, or Firm* — HP Inc. Patent Department

(57) ABSTRACT

Examples analyze at least one of a plurality of planes of image data of print content to determine media expansion characteristics for the print content based at least in part on the at least one of the planes of image data. Examples adjust, prior to printing the print content, at least one plane of image data based at least in part on the media expansion characteristics to thereby compensate for media expansion during printing of the print content.

20 Claims, 10 Drawing Sheets

(56) References Cited

U.S. PATENT DOCUMENTS

| | | |
|---|---|---|
| 2012/0206530 A1 | 8/2012 | Mizes et al. |
| 2013/0286071 A1* | 10/2013 | Armbruster ............ H04N 1/506 347/14 |
| 2013/0293625 A1 | 11/2013 | Massen |
| 2015/0116734 A1* | 4/2015 | Howard ................. B41J 2/2135 358/1.4 |
| 2015/0116735 A1 | 4/2015 | Howard et al. |
| 2016/0031246 A1* | 2/2016 | Sreekumar ............. B41J 11/008 347/5 |
| 2016/0065790 A1* | 3/2016 | Matsunaga .......... G06K 15/102 358/1.9 |

* cited by examiner

MEDIA EXPANSION COMPENSATED PRINT CONTENT

BACKGROUND

A printing device, such as a printer, multifunction printer, and/or other such devices may be used to print content onto a physical medium (also referred to as media or substrate), such as paper. For an ink based printing device, printing material (e.g., ink) may be ejected onto the physical medium (e.g., paper) to thereby print content onto a physical medium.

DRAWINGS

FIGS. 1A-B are block diagrams of example computing devices.

FIGS. 2A-B are block diagrams of example printing devices.

Figure 5A:
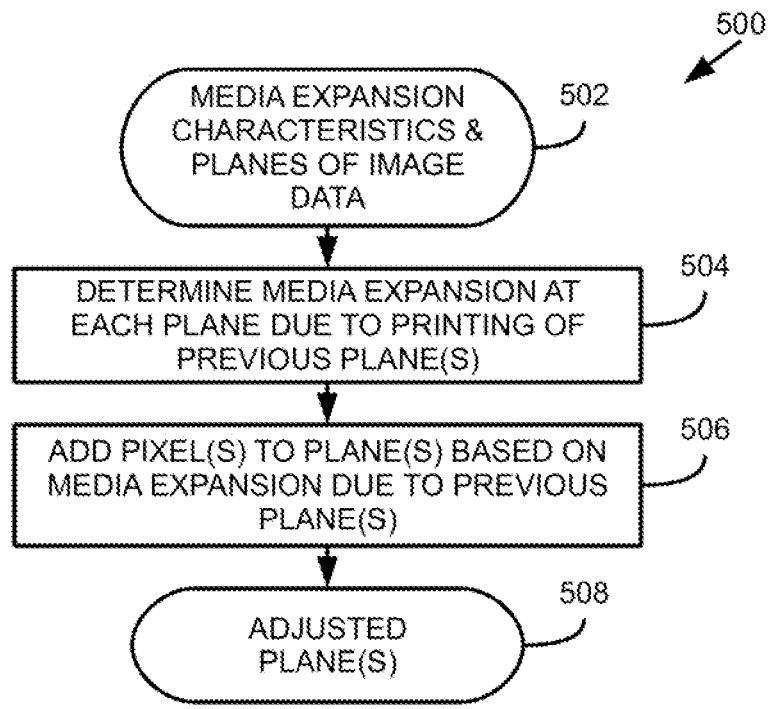
Figure 5B:
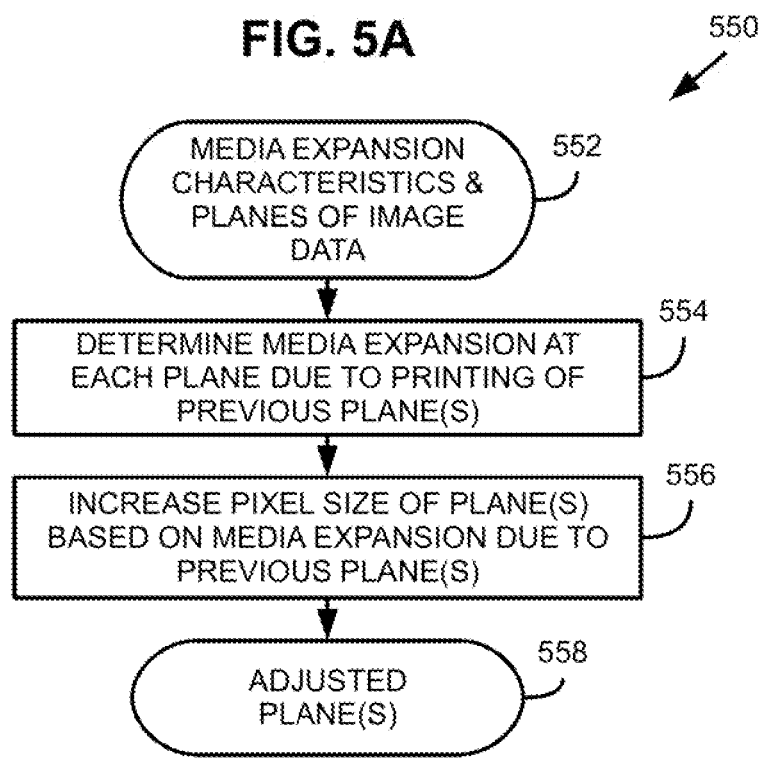

FIGS. 5A-B are flowcharts that illustrate example sequences of operations that may be performed by an example computing device.

Figure 6A:
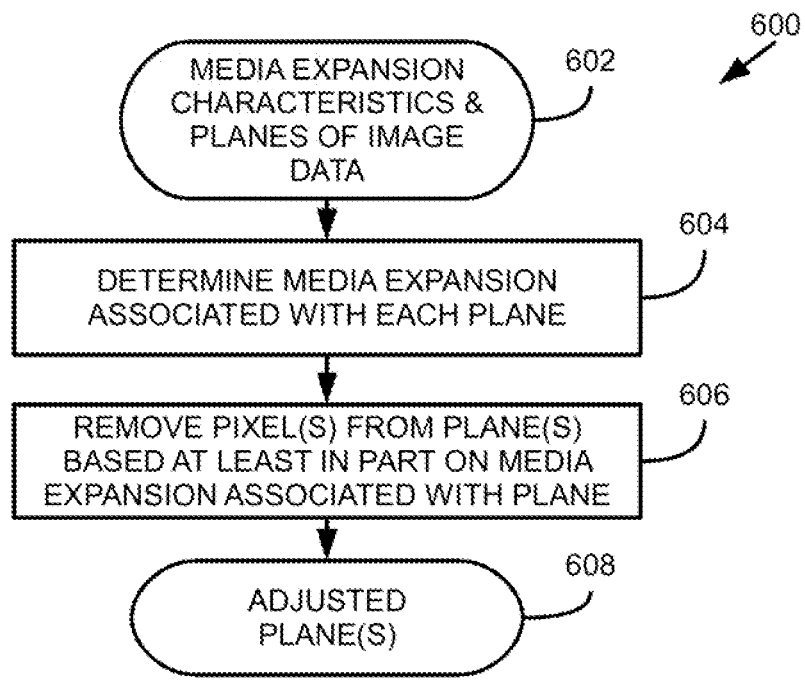
Figure 6B:
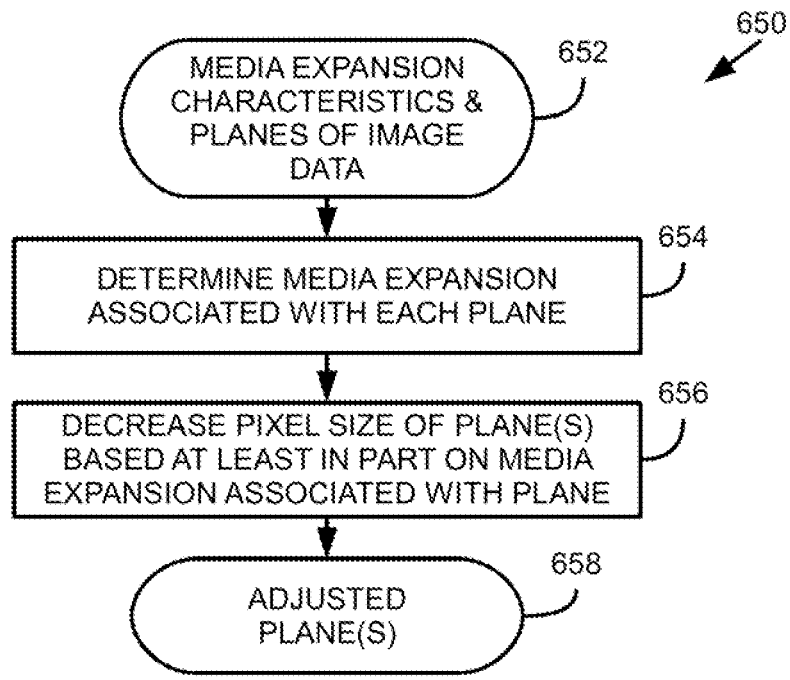

FIGS. 6A-B are flowcharts that illustrate example sequences of operations that may be performed by an example computing device.

Figure 7A:
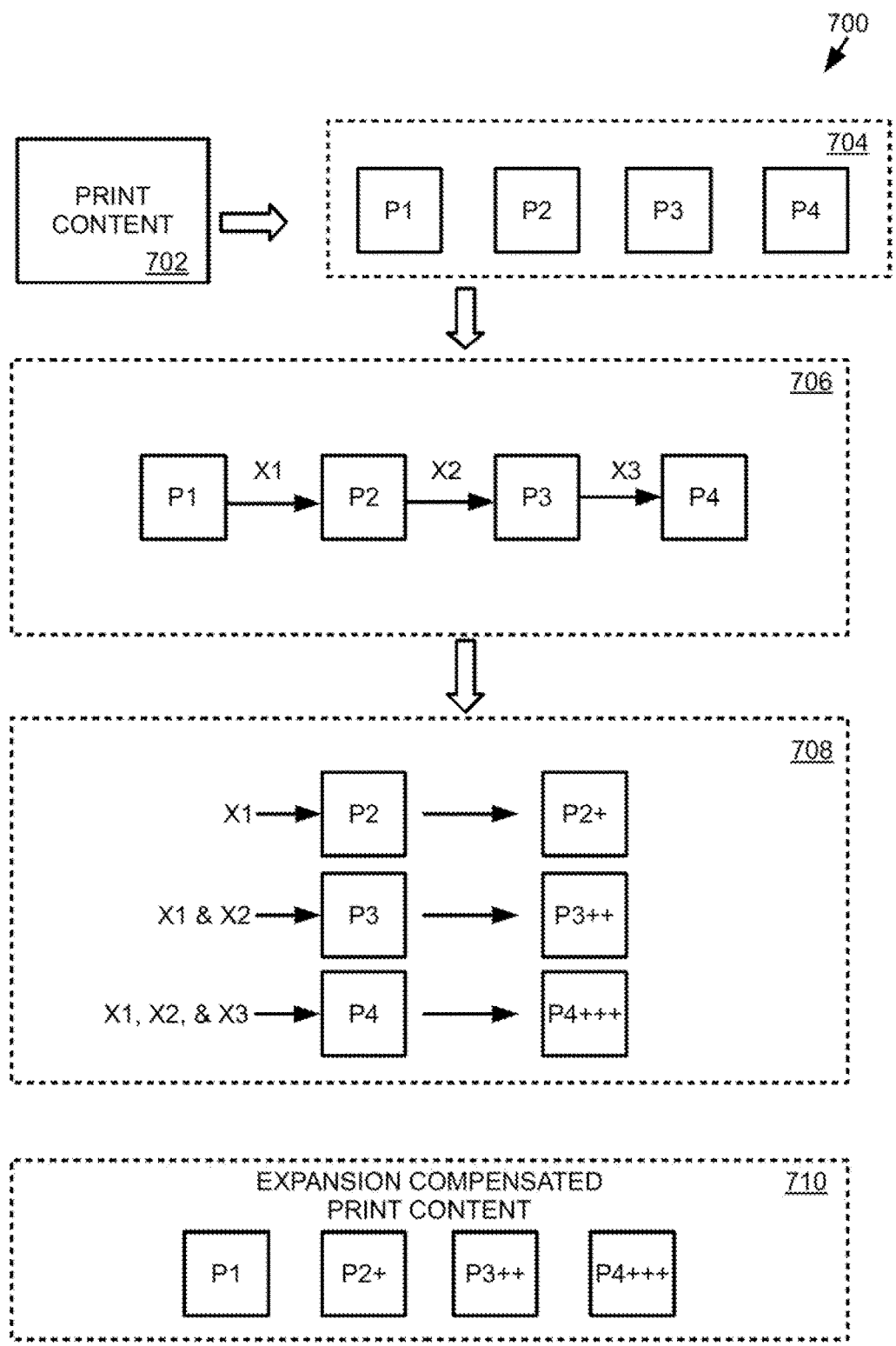

FIG. 7A provides a flow diagram that illustrates an example processing of print content.

Figure 7B:
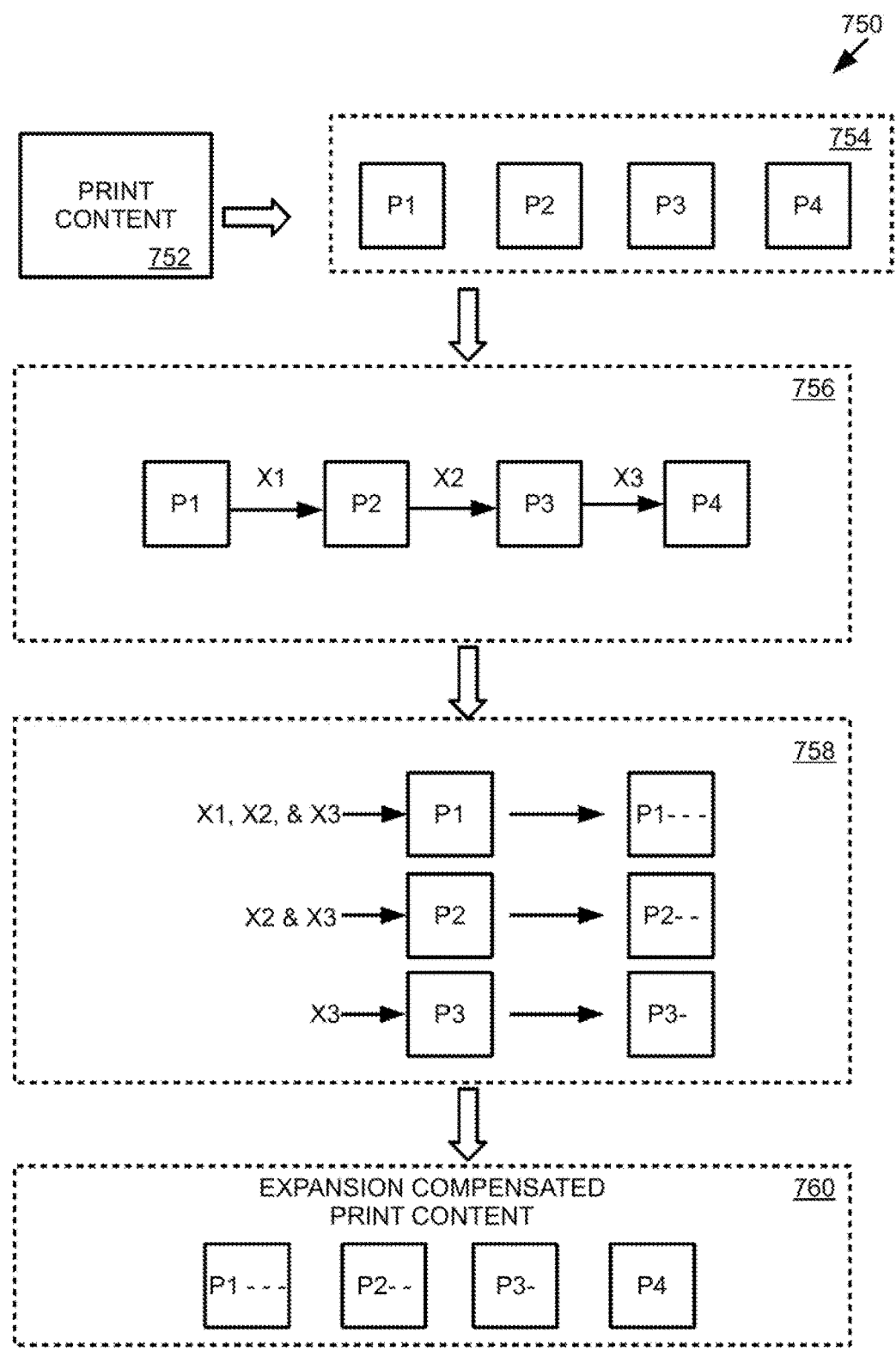

FIG. 7B provides a flow diagram that illustrates an example processing of print content.

Throughout the drawings, identical reference numbers designate similar, but not necessarily identical, elements. Moreover the drawings provide examples and/or implementations consistent with the description; however, the description is not limited to the examples and/or implementations provided in the drawings.

DESCRIPTION

In some printing devices, printheads may span a printing width of a printing device. For example, in some page-wide printing devices, printheads may span the width of the physical medium that may be used by the printing device, and each printhead may comprise print nozzles for applying printing material to the physical medium. The printheads are generally configured to eject, deposit, apply and/or position a printing material (e.g., ink, toner, pre/post treatment materials, gloss enhancers, varnishes, binding material, etc.) on a physical medium to thereby print content. In other examples, printheads may be moved relative to a physical medium during printing.

Printing devices, as described herein, may be two-dimensional printers or three-dimensional (3D) printers. In some examples, a printing device may be utilized to print content onto a physical medium (which may also be referred to as "media" or a "print target"), such as paper or a layer of powder-based build material. In some examples, the printing device may print content by deposition of consumable fluids in a layer-wise additive manufacturing process. Generally, consumable fluids and/or consumable materials may include all materials and/or compounds used, including, for example, ink, toner, fluids or powders, or other raw material for printing. Generally, printing material, as described herein may comprise consumable fluids as well as other consumable materials. Printing material may comprise ink, toner, fluids, powders, colorants, varnishes, finishes, gloss enhancers, binders, and/or other such materials that may be utilized in a printing process. In addition, example printing devices may include page-wide printhead printing devices as well as scanning printhead based printing devices. In page-wide printhead printing devices, printheads may generally be fixed (also referred to as a "fixed array" or "fixed head") and a physical medium may be moved. In scanning printhead based printing devices, printheads may be conveyed along a first axis (a scanning axis) during printing of a swath of print content and a physical medium may be conveyed along a second axis.

In some examples, printing devices may comprise printheads for each color/type of printing material for which the printing device utilizes for printing. Furthermore, example printing devices may apply/deposit printing materials sequentially. For example, in some ink based printing devices that utilize cyan ink, magenta ink, yellow ink, and black ink in printing (which may be referred to as CMYK printing), the printing devices may print with the inks in the following printing order: black ink, cyan ink, magenta ink, and yellow ink. As used herein, a primary color generally refers to a color of printing material for which the printing device utilizes for printing to thereby print content in such primary colors as well as secondary colors by combining the primary colors. For example, the primary colors of an example CMYK printing device generally correspond to cyan, magenta, yellow, and black. In some examples, printing devices may utilize cyan color printing material, magenta color printing material, yellow printing material, black printing material, orange printing material, violet printing material, and/or green printing material. As will be appreciated, printing order may vary based on the number of colors/types of printing material utilized by a printing device. In some examples, printing devices may print a swath of print content by printing a respective portion of each plane of image data, which may be referred to as scanning printhead based printing devices, in such examples, a sequential print order may correspond to an order in which colors/types of printing material are printed for each swath.

Generally, content to be printed by a printing device on a physical medium may be referred to as print content, where the print content may correspond to a digital image. In examples in which some colors/types of printing material may be printed sequentially, the print content may be converted to planes of image data (which may also be referred to as image planes, raster planes, and/or rasters), where each plane of image data may correspond to a particular color/type of printing material. For example, referring to the CMYK printing device discussed above, print content may be converted to a black color image plane, a cyan color image plane, a magenta color image plane, and a yellow color image plane. As will be appreciated, printing with the black color ink according to the black image plane, printing with the cyan color ink according to the cyan color image plane, printing with the magenta color ink according to the magenta color image plane, and printing with the yellow color ink according to the yellow color image plane on a common area of a physical medium generally prints the print content on the physical medium.

In some example printing devices, printing with various colors and/or types of printing materials on the physical medium may cause expansion of the physical medium. For example, for an ink based printing device, printing with a first ink according to a first plane of image data may cause the physical medium to expand due to absorption of ink by the physical medium. Due to the media expansion (i.e., expansion of the physical medium), printing with a second ink according to a second plane of image data after printing the first plane of image data may result in misalignment between printing of the first plane of image data and the second plane of image data on the physical medium. Misalignment during printing of planes of image data may cause visual inaccuracies in the printed content, such as shadowing, bolding, and/or other such visual defects.

Examples provided herein analyze the planes of image data prior to printing print content to determine media expansion characteristics associated with the print content and physical medium, and examples adjust planes of image data based at least in part on the media expansion characteristics. As will be appreciated, adjusting a plane of image data generally adjusts a size of the plane of image data, which in turn adjusts a size of a portion of print content associated with the plane of image data. As will be appreciated, examples generally adjust the planes of image data to compensate for media expansion during printing of the print content. Generally, compensation for media expansion comprises adjusting printing of print content to facilitate alignment for planes of image data sequentially printed. Moreover, compensation generally comprises facilitating color separation accuracy.

Generally, print content may be represented by a digital image that comprises pixels arranged at respective pixel locations. Each pixel corresponds to a set of pixel values that generally correspond to visual characteristics of the pixel (e.g., color level, intensity, brightness, opacity, etc.). A resolution of a digital image (and print content) generally corresponds to an amount of pixels of the digital image and a size of each pixel. In the context of printing devices and planes of image data, a plane of image data may generally correspond to a respective color that the printing device utilizes for printing (e.g., a primary color).

Each plane of image data generally comprises an arrangement of pixels that indicate a color level for the respective color at the respective pixel location. Examples described herein may adjust planes of image data at the pixel level to compensate for media expansion associated with printing of the planes of image data. Adjustment of a plane of image data may comprise: adding at least one pixel (such as adding at least one pixel per row/column), removing pixels (such as removing at least one pixel per row/column), increasing a pixel size, decreasing a pixel size, and/or other such image processes for decreasing or increasing an overall size of a digital image. In some examples, adjusting a particular plane of image data may comprise converting the print content for the particular plane with different settings (e.g., re-ripping). In some examples, print content may be re-processed with a raster image plane processing engine to generate adjusted planes of image data. For example, print content may be converted to the particular plane of image data with a different pixel size for each pixel. In such examples, a size of a plane of image data may be adjusted by adjusting a pixel size, adding pixels, and/or removing pixels. In other examples, a plane of image data may be upscaled (e.g., add pixels) and/or downscaled (e.g., remove pixels) to adjust a size of the plane of image data.

In some examples, the image planes may correspond to a common resolution, and in other examples, some image planes may be different resolutions. As will be appreciated, by adding pixels or adjusting pixel size, a size of a plane of image data may be correspondingly increased. In turn, nozzle data generated from an adjusted plane of image data may cause printing associated with the adjusted plane of image data to increase the printed content thereof.

For example, if a printing device prints a first plane of image data prior to printing a second plane of image data, some examples may increase an overall size of the second plane of image data based at least in part on media expansion associated with printing of the first plane of image data. Additionally, some examples may decrease an overall size of the first plane of image data, prior to printing the first plane of image data, based at least in part on media expansion associated with printing of the first plane of image data. In some examples, a size of the first plane of image data may be decreased and a size of the second plane of image data may be increased. For example, if print content for a CMYK printing process is expected to expand by 1% after printing of the black image plane, the cyan image plane, magenta image plane, and/or yellow image plane may be increased/scaled by 1%. As another example, the black image plane may be reduced/scaled by 1%. Generally, analysis and adjustment of planes of image data may be performed prior to printing of the print content.

Therefore, examples provided herein generally adjust planes of image data for print content to compensate for media expansion due to printing of the print content on a physical medium. As will be appreciated, each plane of image data after a first plane of image data may be increased based on the amount of expansion expected due to printing earlier planes of image to align the later printed image planes. Similarly, earlier planes of image data may be decreased based on an amount of expansion expected due to printing of such planes of image data. In addition, some examples may increase some planes of image data and decrease some planes of image data. Generally, examples provided herein may apply at least two colors and/or types of printing material sequentially onto common locations of a physical medium. In one example, a first printing material may be a black ink and a second printing material may be a gloss enhancer, binding material, varnish, post-treatment material, and/or other such type of printing material generally applied after printing with a colorant. In other examples, more than one color of printing material may be sequentially printed onto common locations of a physical medium. Some examples may utilize two colors of printing material. Other examples may utilize two colors of printing material followed by another type of printing material, in some examples, a different type of printing material may be printed between printing of different colors of printing material. As will be appreciated, the number of colors/types of printing material generally vary based on the printing device in which examples may be implemented. Therefore, examples are not limited to any specific number of colors/types of printing materials.

Figure 1A:
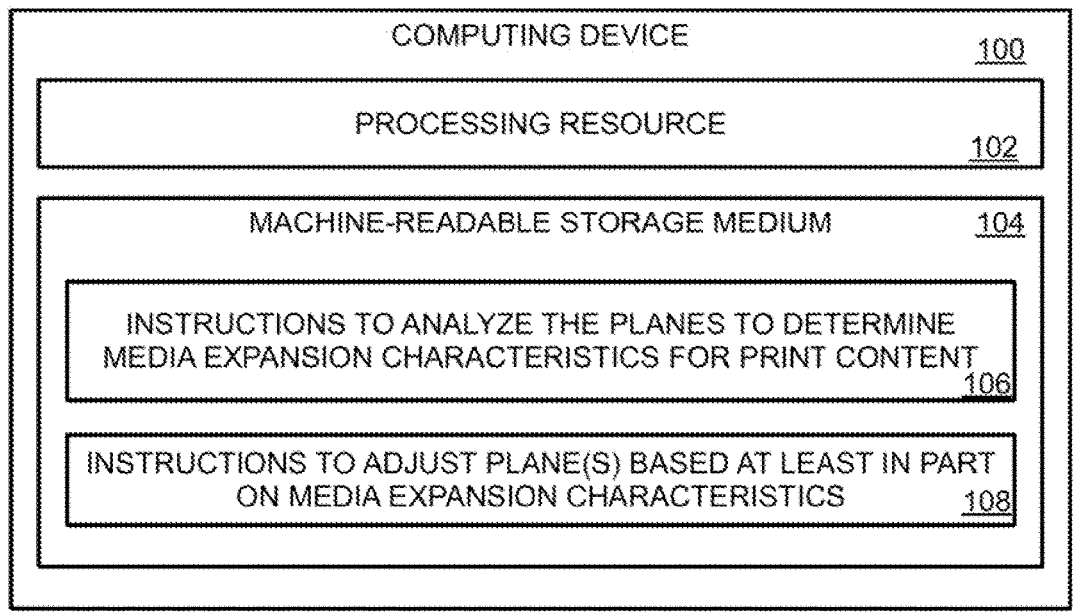
Figure 1B:
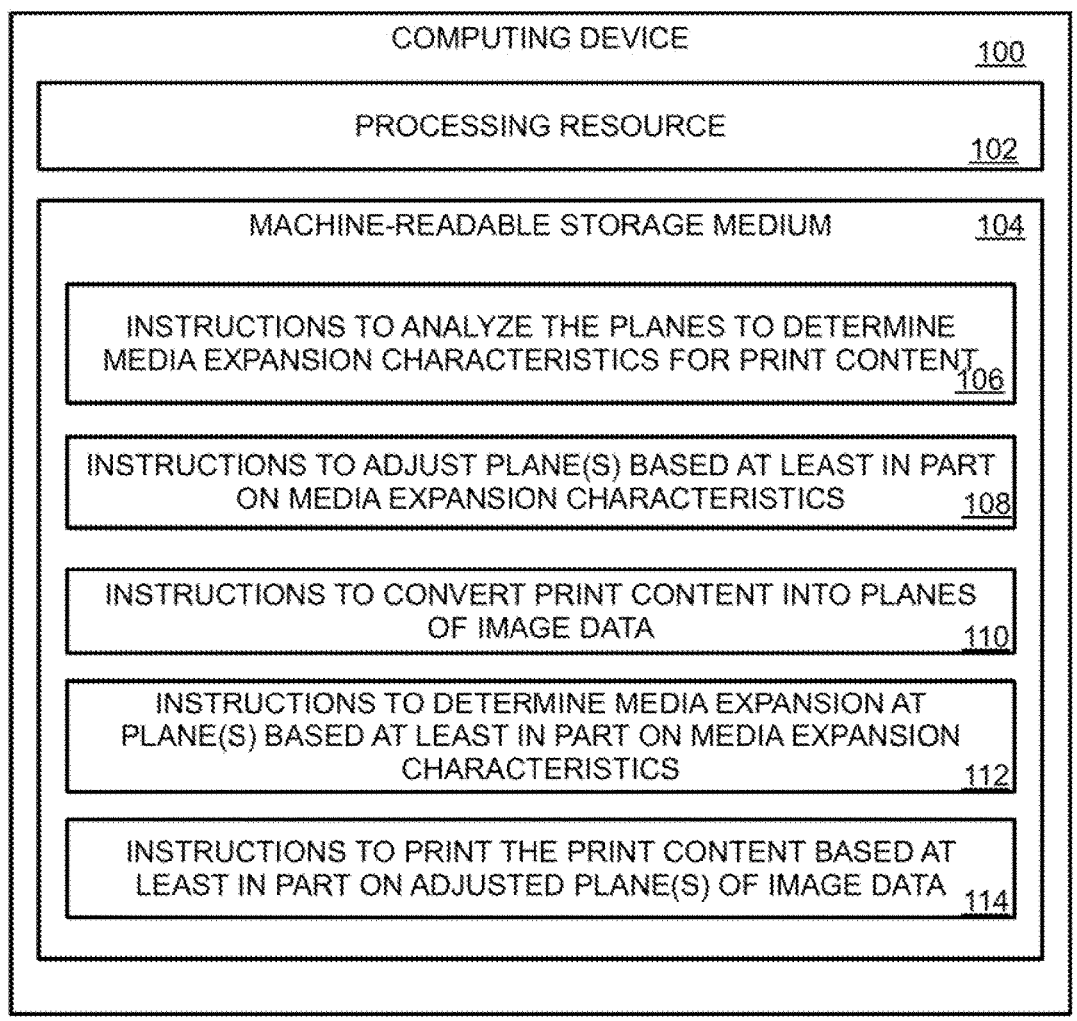

Turning now to FIGS. 1A and 1B, these figures provide block diagrams that illustrate examples of a computing system 100. Generally, an example computing system may comprise a personal computer, a portable electronic device (e.g., a smart phone, a tablet, a laptop, a wearable device, etc.), a workstation, smart device, server, a printing device, a processing node of a server, combinations of data processing resources and/or memory resources, and/or any other such data processing devices.

In examples such as the examples of FIGS. 1A-B, the computing system 100 comprises a processing resource 102 and a machine-readable storage medium 104, which may be referred to as a memory and/or a memory resource. In the examples described herein, a processing resource 102 may include at least one hardware-based processor. Furthermore, the processing resource 102 may include one processor or multiple processors, where the processors may be configured in a single computing system 100 or distributed across multiple systems connected locally and/or remotely. As will be appreciated, a processing resource 102 may comprise at least one general purpose data processor and/or at least one specialized data processors. For example, the processing resource 102 may comprise a central processing unit (CPU), a graphics processing unit (GPU), an application-specific integrated circuit (ASIC), and/or other such configurations of logical components for data processing.

The machine-readable storage medium 104 may represent the random access memory (RAM) devices comprising the main storage of the example computing device 100, as well as any supplemental levels of memory, e.g., cache memories, non-volatile or backup memories (e.g., programmable or flash memories), read-only memories, mass-storage resources, etc. in addition, machine-readable storage medium 104 may be considered to include memory storage physically located elsewhere, e.g., any cache memory in a microprocessor, as well as any storage capacity used as a virtual memory, e.g., as stored on a mass storage device or on another computing device/system in communication with the example computing system 100. In some examples, the machine-readable storage medium 104 may correspond to various types of storage mediums, such as computer readable storage medium, which may include volatile and non-volatile, removable and non-removable tangible media implemented in any technology for the storage and processing of information. Computer readable and/or machine-readable storage medium may include RAM, ROM, erasable programmable read-only memory (EPROM), electrically erasable programmable read-only memory, flash memory or other solid state memory technology, portable compact disc memory, or other optical storage, or any other medium that may be used to store executable instructions and information. Furthermore, the machine-readable storage medium 104 may be non-transitory.

Generally, the machine-readable storage medium 104 may be encoded with and/or store instructions that may be executable by the processing resource 102, where execution of such instructions may cause the processing resource 102 and/or computing system 100 to perform the functionalities, processes, and/or sequences of operations described herein. In the example of FIG. 1A, the machine-readable storage medium 104 comprises instructions for adjusting print content to compensate for media expansion. In particular, the example machine-readable storage medium 104 comprises instructions to analyze planes of image data of the print content to determine media expansion characteristics for the print content based at least in part on the planes of image data 106. The machine-readable storage medium 104 further comprises instructions to adjust at least one plane of image data based at least in part on the media expansion characteristics to thereby compensate for media expansion during printing of the print content 108.

In some examples of a computing device, such as the example computing device 100 shown in FIG. 1B, the non-transitory machine-readable storage medium 104 may further comprise instructions to convert the print content into the planes of image data 110. In some examples, the computing device converts the print content into a plurality of planes of image data, where each respective plane corresponds to a primary color of a printing process and/or a type of printing material utilized by the printing device. For example, in a CMYK printing process, the print content may be converted into a cyan plane of image data, a magenta plane of image data, a yellow plane of image data, and a black plane of image data.

In some examples, the non-transitory machine readable storage medium 104 may further comprise instructions to determine media expansion for at least one plane of image data based at least in part on the media expansion characteristics 112. In general, the media expansion characteristics correspond to a manner in which the media may expand based on the amount of printing material to be used for printing the print content at respective pixel locations, print speed, and/or characteristics of the media (e.g., weight, material, absorption characteristics, etc.). In turn, the media expansion determined for each plane corresponds to a determined expansion of the media at the printing of each plane of image data. For example, the media expansion characteristics may correspond to a rate and/or amount of expansion for a media corresponding to density of printing material. Media expansion characteristics may be determined based at least in part on a printing speed associated with a printing device and/or printing process, media characteristics (e.g., material, density, weight, surface porosity, etc), printing material characteristics (e.g., type, composition, viscosity, printing density, etc.), and/or other such characteristics that may correspond to expansion of media in a printing process.

Therefore, by determining an amount of printing material, a density of the printing material associated with the printing of each plane of image data, and/or media characteristics of the physical medium, the computing device may determine an amount of media expansion associated with at least one of the planes of image data based at least in part on the media expansion characteristics. For example, if at least a portion of a black plane of image data is to be printed first and at least a portion of a cyan plane of image data is to be printed immediately after the at least a portion of the black plane, computing devices may determine an amount of media expansion that will occur due to printing the at least a portion of the black plane of image data. As a specific example, a computing device may determine that the media expansion due to printing the at least a portion of the black plane of image data may be 1%. In this example, the at least a portion of the cyan image plane may be adjusted based on the 1% media expansion. In this example, the at least a portion of the black image plane may be adjusted based on the 1% media expansion.

Returning to FIG. 16, in some examples, the non-transitory machine readable storage medium 104 may comprise instructions to print the print content based at least in part on the adjusted planes of image data 114. In some examples, the computing device may be connected to a printing device, and the computing device may communicate the adjusted planes of image data to the printing device to thereby print the print content. In other examples, the computing device may correspond to a printing device, and the computing device may control printheads to thereby print the adjusted planes of image data. As will be appreciated, the printed print content is generally media expansion compensated, where the print content is adjusted based on expansion of the physical medium due to the printing process and the printing material density/saturation at various locations on the physical medium. Generally, the media expansion compensated print content may facilitate alignment of the print content on the physical medium.

Figure 2A:
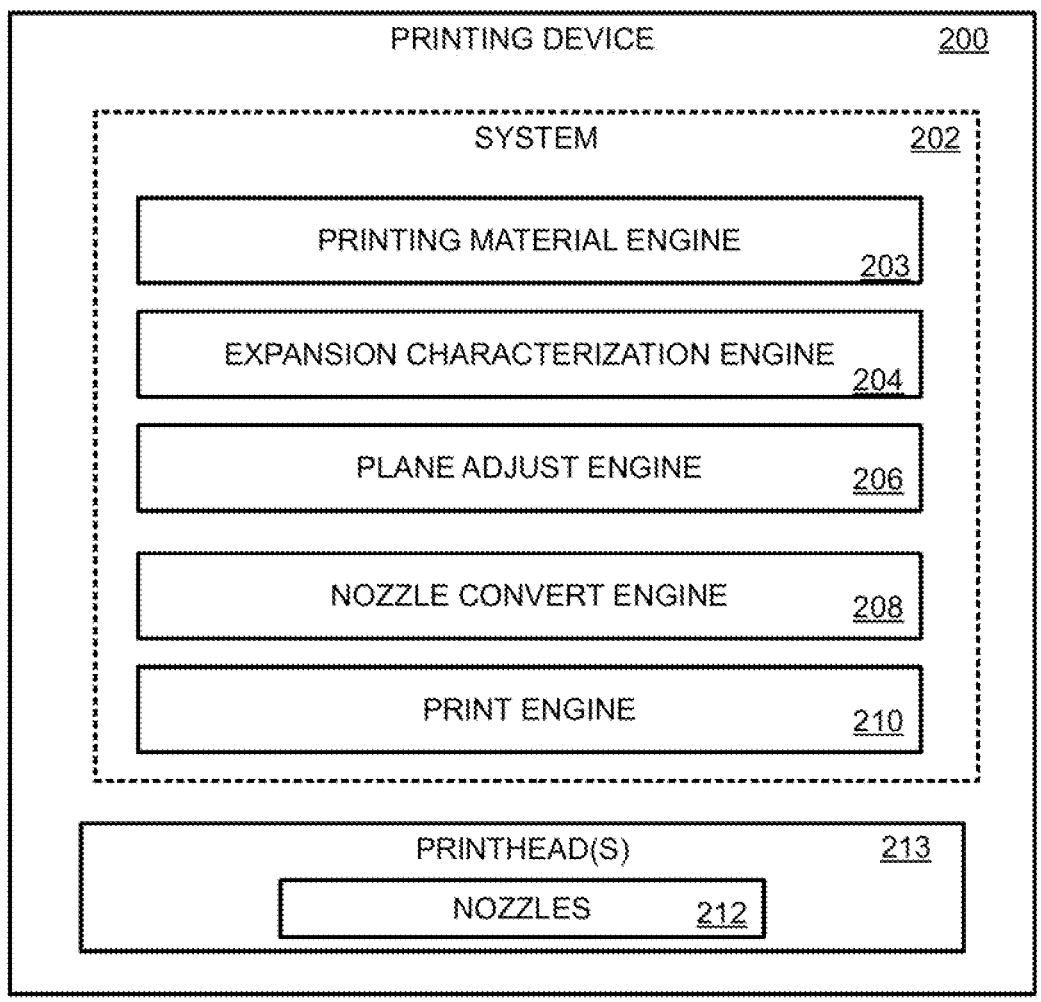

FIGS. 2A-6 provide a block diagrams of examples of a printing device 200. As shown in FIGS. 2A-B, the example printing device generally comprises a system 202 including engines. Engines, as described herein, may be any combination of hardware and programming to implement the functionalities of the respective engines. In some examples described herein, the combinations of hardware and programming may be implemented in a number of different ways. For example, the programming for the engines may be processor executable instructions stored on a non-transitory machine-readable storage medium and the hardware for the engines may include a processing resource to execute those instructions. In these examples, a computing system implementing such engines may include the machine-readable storage medium storing the instructions and the processing resource to execute the instructions, or the machine-readable storage medium may be separately stored and accessible by the computing system and the processing resource. In some examples, some engines may be implemented in circuitry.

In this example, the example computing system 200 of FIG. 2A comprises a system 202 including engines 203-210 that may print media expansion compensated print content. Similarly, the example computing system 200 of FIG. 2B comprises a system 202 including engines 203-210, 218. In the examples, the printing device 200 comprises a printing material engine 203 to determine an amount of printing material associated with printing of at least one plane of image data of a plurality of planes of image data associated with print content. The printing device 200 further comprises an expansion characterization engine 204 to determine media expansion characteristics for the print content based at least in part on the plurality of planes of image data and the amount of printing material associated with printing of at least one plane of image data of the plurality. Furthermore, the printing device 200 comprises a plane adjust engine 206 to adjust a respective plane of image data based at least in part on the media expansion characteristics. In some examples, the plane adjust engine 206 may adjust more than one plane of image data, and in some examples, the plane adjust engine 206 may adjust one plane of image data.

The printing device 200 further comprises a nozzle convert engine 208 to convert the plurality of planes of image data into nozzle data for a plurality of nozzles of at least one printhead of the printing device 200. The printing device 200 further comprises a print engine 210 to control the plurality of nozzles 212 of the at least one printhead 213 based at least in part on the nozzle data. Generally, the print engine 210 controls the at least one printhead to thereby print media expansion compensated print content.

Figure 2B:
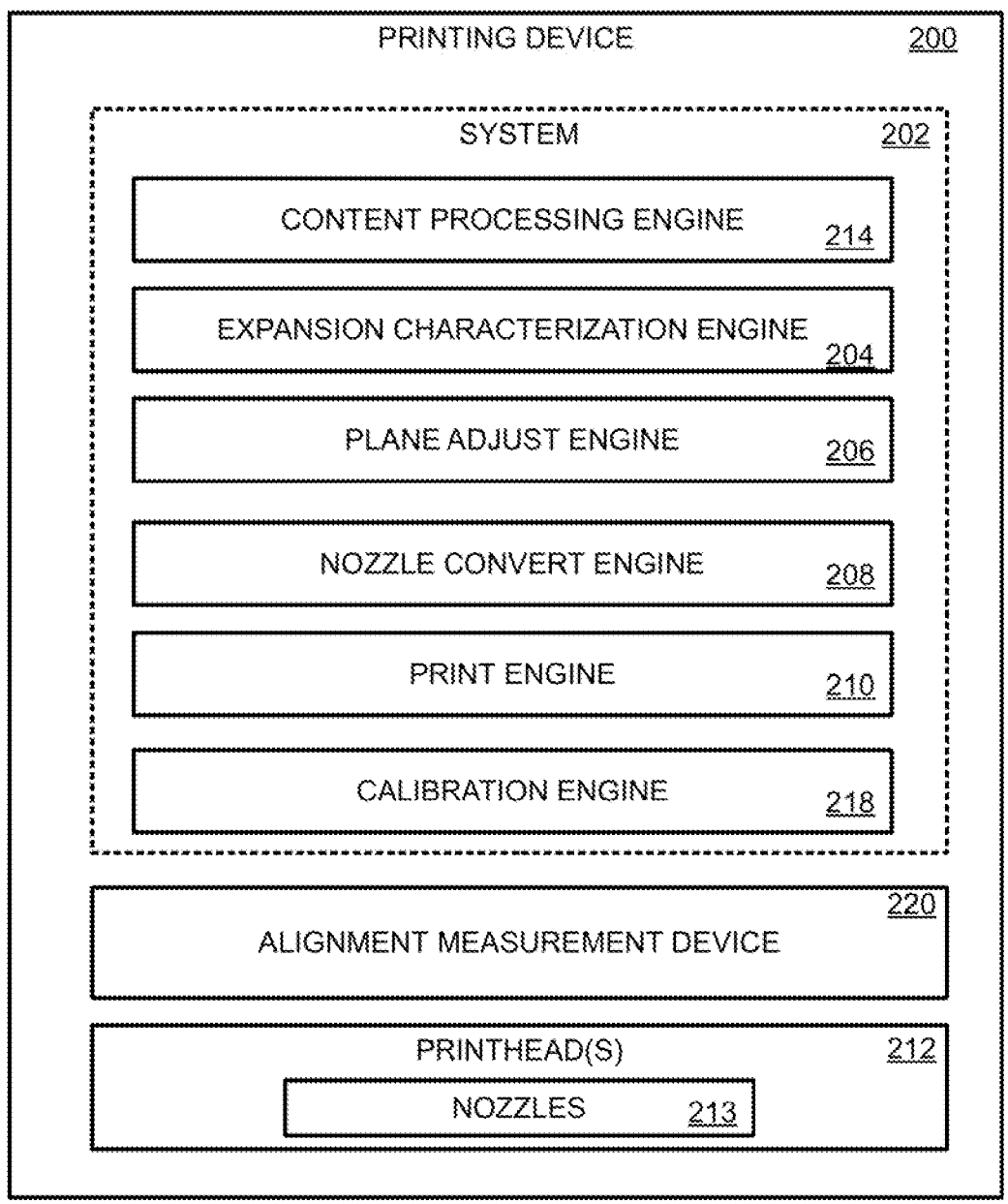

In addition, in some examples, such as the example printing device 200 of FIG. 2B, the computing system 200 may comprise a calibration engine 218 to control an alignment measurement device 220 to receive printing measurement data from the alignment measurement device. In addition, the calibration engine may analyze the printing measurement data to determine an amount of misalignment for the printing device. In such examples, the analysis of the printing measurement data and the determined amount of misalignment may be implemented as a feedback mechanism such that the expansion characterization engine may determine media expansion characteristics based at least in part on the amount of misalignment.

In some examples, the printing device may comprise at least one printhead for each primary color that the printing device utilizes for printing. For example, if the printing device implements a CMYK printing process cyan, magenta, yellow, and black), the printing device may comprise at least four printheads. In some examples, the printing device may comprise two print heads for each primary color. In some examples, the printing device may comprise three printheads for each primary color. Furthermore, as discussed previously, in some example printing devices, printing with each primary color may be performed sequentially, such that a first plane of image data for a first primary color may be printed first; a second plane of image data for a second primary color may be printed second; a third plane of image data for a third primary color may be printed third; etc. In addition, some example printing devices comprise additional printheads that may be associated with other types of printing materials generally not associated with printing of a color (where such color associated printing materials may be referred to as colorants). Examples of printing materials generally not associated with printing of a color include pre/post treatment materials, gloss enhancers, varnishes, binding material, etc.

For example, a printing device may comprise a first printhead for a first primary color; a second printhead for a second primary color; a third printhead for a third primary color; and a fourth printhead for a fourth primary color. In this example, the plurality of planes of image data may comprise a first plane of image data corresponding to the first primary color, where the first plane of image data has a first print order. The plurality of planes may comprise a second plane of image data corresponding to the second primary color, where the second plane of image data has a second print order. The plurality of planes may comprise a third plane of image data corresponding to the third primary color, where the third plane of image data has a third print order. In addition, the plurality of planes may comprise a fourth plane of image data corresponding to the fourth primary color, where the fourth plane of image data has, a fourth print order.

In this example, the printing device may determine a first media expansion associated with the second plane of image data. The first media expansion may correspond to a first amount of printing material associated with printing of the first plane of image data. The printing device may determine a second media expansion associated with the third plane of image data. The second media expansion may correspond to the first amount of printing material and a second amount of printing material associated with printing of the second plane of image data. The printing device may determine a third media expansion associated with the fourth plane of image data. The third media expansion corresponds to the first amount of printing material, the second amount of printing material, and a third amount of printing material associated with printing of the third plane of image data. Based on the first media expansion, second media expansion, and the third media expansion, the printing device may adjust the first image plane, the second image plane, the third image plane, and/or the fourth image plane prior to printing the planes of image data. After adjustment, the printing device may print the planes of image data to thereby print the print content, where adjustment of the first, second, third, and/or fourth planes of image data may compensate for expansion of the physical medium during printing of the print content.

FIGS. 3-6B provide flowcharts that provide example sequences of operations that may be performed by an example computing device, such as a printing device, and/or a processing resource thereof to perform example processes and methods of the disclosure. In some examples, the operations included in the flowcharts may be embodied in a memory (such as the machine-readable storage medium 104 of FIGS. 1A-B) in the form of instructions that may be executable by a processing resource to cause the computing device (e.g., the example computing device 100 of FIG. 1A or 1B, the example printing device 200 of FIG. 2A or 2B, etc.) to perform the operations corresponding to the instructions. Additionally, the examples provided in FIGS. 3-6B may be embodied in computing systems, machine-readable storage mediums, processes, and/or methods. In some examples, the example processes and/or methods disclosed in the flowcharts of FIGS. 3-6B may be performed by engines implemented in a computing device, such as the example engines 204-10, 218 of FIG. 2A or 2B.

Figure 3:
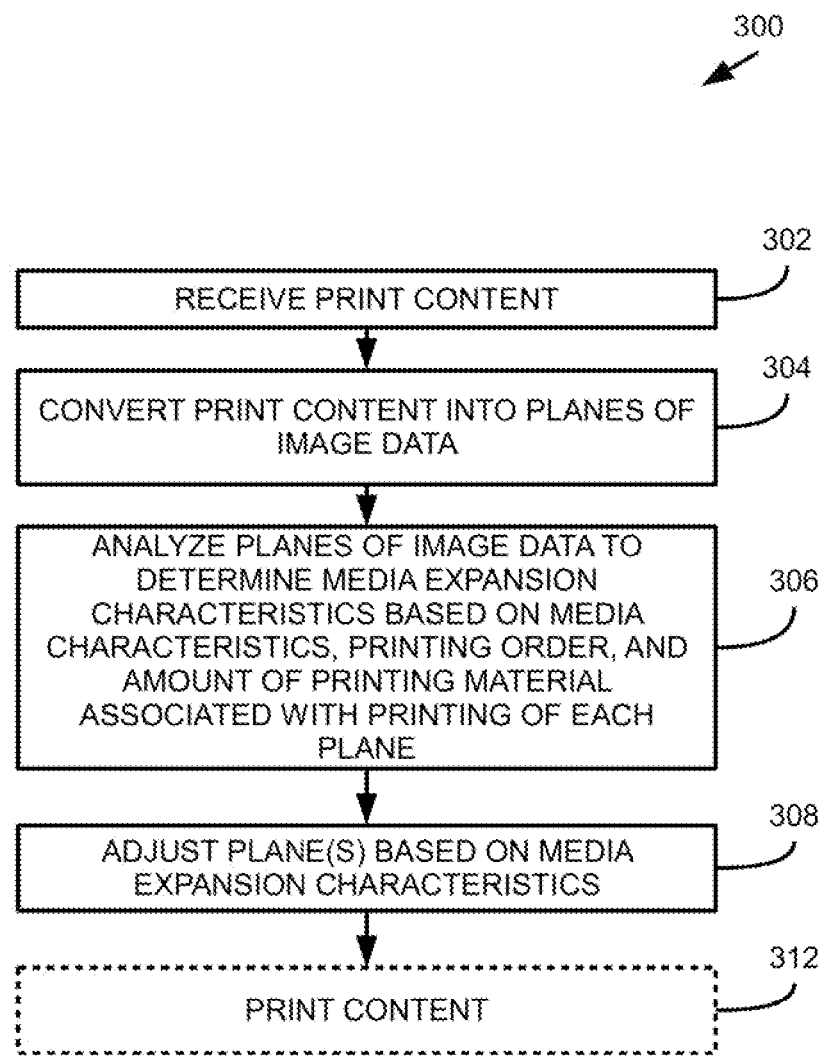
FIG. 3 is a flowchart that illustrates an example sequence of operations that may be performed by an example computing device.

FIG. 3 provides a flowchart 300 that illustrates an example sequence of operations that may be performed by a computing device. As shown, the computing device may receive print content (block 302). As will be appreciated, print content may comprise a digital image that corresponds to a set of pixels, where the pixels have pixel values corresponding to various visual characteristics. For example, in a CMYK printing process, print content may comprise a digital image corresponding to a set of pixels, where each pixel has a pixel value corresponding to a cyan color level, a pixel value corresponding to a magenta color level, a pixel value corresponding to a yellow color level, and a pixel value corresponding to a black color level. The computing device may convert the print content into a plurality of planes of image data (block 304), where the planes of image data are printed sequentially. Returning to the CMYK printing process example, the print content may be converted into a cyan image plane, a magenta image plane, a yellow image plane, and a black image plane. In some example CMYK printing processes, the sequential printing order may be black, cyan, magenta, and yellow. The computing system analyzes the planes of image data to determine media expansion characteristics for the print content based at least in part on media characteristics, a printing order of each plane of image data, and/or an amount of printing material associated with printing of each plane of image data (block 306).

Based on the media expansion characteristics, the computing system adjusts at least one plane of image data to thereby compensate for expansion of a physical medium during the sequential printing of the planes of image data (block 308). In some examples, the computing device may print the print content on the physical medium to thereby generate media expansion compensated printed content (block 312). In some examples, printing the print content generally comprises converting the planes of image data into nozzle data. Generally nozzle data corresponds to instructions for each individual nozzle of printheads of a printing device, where the nozzle data controls the ejection/dispensation/application of printing material from each respective nozzle at a respective location on media. As will be appreciated, by adjusting at least one plane of image data, examples thereby adjust nozzle data for corresponding print content, where the adjustment thereof generally compensates for media expansion of the physical medium associated with ejecting/depositing/applying printing material to the physical medium.

Figure 4:
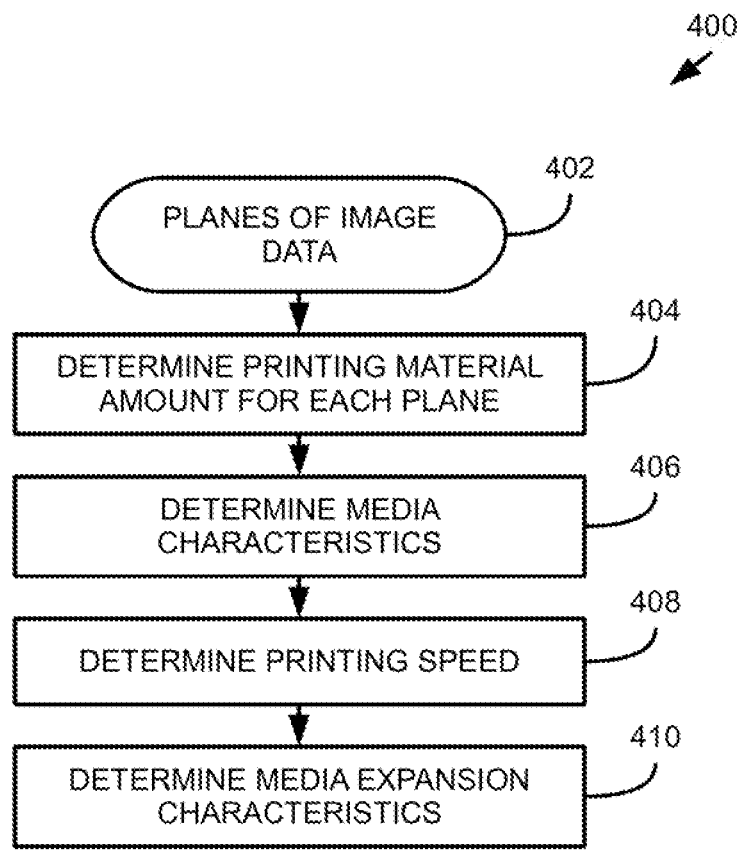
FIG. 4 is a flowchart that illustrates an example sequence of operations that may be performed by an example computing device.

FIG. 4 provides a flowchart 400 that illustrates an example sequence of operations that may be performed by a computing device based at least in part on planes of image data 402 of print content to determine media expansion characteristics. The computing device may analyze each plane of image data to determine an amount of printing material associated with printing of the plane of image data (block 404). As will be appreciated, each plane of image data includes pixel values for particular pixel locations that indicate a color level for the primary color associated with the plane of image data. Therefore, an amount of printing material associated with a particular location of the media may be determined based at least in part on the color level for the pixel location corresponding to the particular location of the media.

Furthermore, the computing device determines media characteristics (block 406). Media characteristics include for example, a type of media (e.g. paper, paper composite, linen based materials, cotton based materials, or other such types of media), density of the media, surface finish for the media, and/or other such characteristics that may affect absorption of printing material by the media. In some examples, the expansion characterization engine 204 of FIGS. 2A-B may determine media characteristics. In addition, the computing device determines a printing speed of the printing process corresponding to the print content (block 408). Generally, print speed and/or media characteristics may be predefined parameters included in a print job loaded by a printing device for printing, in some examples, the print speed, media characteristics, and/or characteristics of printing material to be used in the printing process may be input by a user and/or default settings associated with the printing device and/or printing process. Based on the printing material amount for each plane, the media characteristics, and/or the printing speed associated with the print content, the computing system determines media expansion characteristics (block 410), where the media expansion characteristics generally define expansion of a physical medium due to printing of the planes of image data.

FIGS. 5A, 5B, 6A, and 6B provide flowcharts that illustrate example adjustments of planes of image data. As shown, in FIG. 5A, based on the media expansion characteristics and the planes of image data 502, the computing device determines media expansion at each plane of image data expected to occur due to printing of earlier printing ordered planes of image data (block 504). For example, for a plane of image data having a print order of second, the computing system may determine an amount of expansion of the media that is expected to occur due to printing of the plane of image data having a print order of first. Based on the media expansion at each plane, the computing device may add at least one pixel to planes of image data (block 506) to thereby generate adjusted planes of image data 508. In general, adding pixels may comprise adding a new pixel having pixel values that are an average of neighboring pixels. For example, for a row of pixels of an image plane, some examples may add a new pixel every tenth pixel position in the row. As will be appreciated, the added pixels generally increase the overall size of the image plane as well as features defined by the pixels of the image plane such that the image plane and features correspond to the expanded physical medium. For example, for a first image plane having a first print order and a second image plane having a second print order, the computing device may add pixels to the second image plane to thereby increase an output area of the second image plane to align with the printed first image plane on the physical medium, where the increased output area for the second image plane may generally correspond to the media expansion that would occur due to printing of the first image plane.

In FIG. 5B, based on the media expansion characteristics and the planes of image data 552, the computing device determines media expansion at each image plane that would occur from printing of previous (e.g., earlier printing order) planes (block 554). The computing system may increase a size of each pixel of each plane based at least in part on the media expansion that is expected to occur due to printing of earlier printing ordered image planes (block 556) to thereby generate adjusted image planes 558. As will be appreciated, in examples similar to the example of FIG. 5B, a size of pixels of at least one image plane may be increased such that the overall size of the at least one image plane and/or features of the image planes may correspond to an expanded physical medium.

In FIG. 6A, based on the media expansion characteristics and the planes of image data 602, the computing device determines media expansion associated with each image plane (block 604). The computing system may remove at least one pixel from at least one plane of image data based at least in part on the media expansion associated with each plane (block 606). In these examples, removing at least one pixel may comprise replacing two or more neighboring pixels with a single pixel having a pixel value that is based on the pixel values of the two or more neighboring pixels. Generally, the number of pixels removed for an image plane may be based at least in part on media expansion that would occur due to printing of the plane. For example, if a black image plane has a first print order and a cyan image plane has a second print order, some examples may remove pixels of the black image plane to compensate for media expansion due to printing of the black image plane. For example, if the media expansion characteristics indicate that the media expansion due to printing the black image plane is 0.5%, some examples may reduce an overall size of the black image plane by removing pixels corresponding to 0.5% of the size of the image plane. As will be appreciated, the removal of pixels is performed proportionally, such that relative features of the image plane are preserved but reduced in size.

In FIG. 6B, based at least in part on the media expansion characteristics and the planes of image data 652, the computing device may determine media expansion associated with each plane (block 654). The computing device decreases a pixel size of pixels of at least one plane of image data based at least in part on media expansion associated with each image plane (block 656) to thereby generate adjusted planes of image data 658. As will be appreciated, decreasing a size of pixels of a plane of image data may reduce a size of the plane of image data while preserving proportionality of features of the plane of image data.

FIGS. 7A-B provide flow diagrams illustrating example processing of print content. In FIG. 7A, the print content 702 is converted to planes of image data (block 704). In this example, the planes of image data are labeled 'P1', 'P2', 'P3', and 'P4', where the planes of image data may have a print order of P1, P2, P3, and P4. Therefore, the printing process and/or printing device for the print content may print with four colors/types of printing material (e.g., a CMYK printing device and process). As will be appreciated, the print content may be converted to more planes of image data or less planes of image data depending on the printing process and/or printing device with which the print content will be printed. Media expansion associated with printing of each plane of image data may be determined based at least in part on the planes of image data, media characteristics, and/or media expansion characteristics (block 706). As shown in the example, a first media expansion (labeled 'X1') may be determined that is associated with printing of P1; a second media expansion (labeled 'X2') may be determined that is associated with printing of P1 and P2; and a third media expansion (labeled 'X3') may be determined that is associated with printing of P1, P2, and P3.

Based on the determined media expansions, some of the planes of image data may be adjusted to compensate for the expected media expansion (block 708). In this example, based on the X1 media expansion, P2 may be adjusted by increasing a size of P2 (which is labeled 'P2+'). Similarly, based on the X1 and X2 media expansion, P3 may be adjusted by increasing a size of P3 (which is labeled 'P3++'). In addition, based on the X1, X2, & X3 media expansion, P4 may be adjusted by increasing a size of P4 (which is labeled 'P4+++'). As discussed previously, adjusting a plane of image by increasing a size may comprise adding pixels and/or increasing a pixel size of pixels of the image plane. By adjusting at least one of the planes of image data, expansion compensated print content 710 is generated. Generally, media expansion corresponds to a non-linear relationship with an amount of printing material applied to corresponding locations on media. As media approaches a saturation point (e.g., a point at which the media has absorbed a material dependent limit), expansion corresponding to the amount of printing material may decrease.

Therefore, as illustrated in this example, planes of image data may be adjusted based on the expected media expansion due to printing of previously printed planes of image data. In particular, P2 is adjusted based on the media expansion expected from printing of P1; P3 is adjusted based on the media expansion expected from printing of P1 and P2; and P4 is adjusted based on the media expansion expected from printing of P1, P2, and P3. In some examples, therefore, a size of planes of image data (which corresponds to a printing area) may be increased based on expected media expansion from printing of earlier printing ordered planes of image data. In this example, the expansion compensated print content comprises P1, P2+, P3++, and P4+++. In some examples, a size of each plane of image data may generally correspond to print order, where later printing ordered planes of image data may generally be larger in area than earlier printing ordered planes of image data. For example, referring to the expansion compensated print content of FIG. 7A, with regard to size (e.g., area) of the planes of image data, the relative size may be expressed as: P4+++≥P3++≥P2+≥P1.

In FIG. 7B, print content 752 is converted into planes of image data (block 754), which are labeled 'P1', 'P2', 'P3', and 'P4'. In this example, the print order of the planes of image data is P1, P2, P3, and P4. Based on media expansion characteristics, the planes of image data, and/or media characteristics, an expected media expansion is determined that is associated with printing of the planes of image data (block 756). In particular, in this example, a first media expansion ('X1') is determined that corresponds to printing of P1; a second media expansion ('X2') is determined that corresponds to printing of P1 and P2; and a third media expansion ('X3') is determined that corresponds to printing of P1, P2, and P3.

Some of the planes of image data may be adjusted by decreasing a size of the planes of image data based on expected media expansion (block 758) to thereby generate expansion compensated print content 760. In this example, based on the X1, X2, and X3 media expansion, P1 is adjusted by decreasing a size of P1, where the adjusted plane is labeled P1---. In addition, based on the X2 and X3 media expansion, P2 is adjusted by decreasing a size of P2, where the adjusted plane is labeled P2--. Similarly, P3 is adjusted by decreasing a size of P3 based at least in part on the X3 media expansion, where the adjusted plane is labeled P3-. Therefore, in some examples similar to the example of FIG. 7B, planes of image data printed earlier in a print order may be reduced in size to compensate for media expansion expected due to printing of such planes. As discussed previously, adjusting a plane of image data by decreasing a size of the plane of image data may comprise removing pixels of the plane of image data and/or decreasing a pixel size of pixels of the plane of image data. In this example, a relative relationship of the planes of image data based on size may be expressed as: $P1 \text{---} \leq P2 \text{--} \leq P3 \text{--} \leq P4$.

Therefore, examples described herein may adjust print content to compensate for media expansion associated with printing of the print content. Generally, examples may adjust print content prior to printing any portion of the print content. By adjusting print content prior to printing of the print content, examples may reduce alignment issues generally associated with media expansion during printing. In some examples, alignment monitoring may further be implemented such that media expansion characteristics may be further analyzed and incorporated into adjusting print content.

Furthermore, while some examples provided herein refer to colors and/or primary colors, other examples contemplated hereby may adjust planes of image data for other types of printing materials, such as varnishes, glosses, finishes, binders, colorless and/or invisible fluids, etc. Generally, example adjustments as described herein may be performed for printing processes and/or printing devices that eject/deposit/apply two or more printing materials sequentially.

While various examples are described herein, elements and/or combinations of elements may be combined and/or removed for various examples contemplated hereby. For example, the example operations provided herein in the flowcharts of FIGS. 3-6B may be performed sequentially, concurrently, or in a different order. Moreover, some example operations of the flowcharts may be added to other flowcharts, and/or some example operations may be removed from flowcharts. Furthermore, in some examples, various components of the example computing device of FIGS. 1A and 1B and the example printing device of FIGS. 2A and 2B may be removed, and/or other components may be added. Similarly, in some examples various instructions of the example memories and/or machine-readable storage mediums (such as the machine-readable storage medium of FIGS. 1A and B) may be removed, and/or other instructions may be added (such as instructions corresponding to the example operations of FIGS. 3-6B).

The preceding description has been presented to illustrate and describe examples of the principles described. This description is not intended to be exhaustive or to limit examples to any precise form disclosed. Many modifications and variations are possible in light of this description.

The invention claimed is:

1. A non-transitory machine-readable storage medium comprising instructions executable by a processing resource of a computing device to cause the computing device to:
   for a plurality of planes of digital image data of print content, analyze at least one plane of digital image data of the plurality to determine media expansion characteristics for the print content based at least in part on the at least one plane of digital image data; and
   prior to printing any of the print content, adjust a respective plane of digital image data of the plurality of planes of digital image data based at least in part on the media expansion characteristics to thereby compensate for media expansion during printing of the print content.

2. The non-transitory machine-readable storage medium of claim 1, further comprising instructions to:
   print the print content by controlling at least one printhead based at least in part on the respective adjusted plane of digital image data.

3. The non-transitory machine-readable storage medium of claim 1, wherein the instructions to adjust the respective plane of digital image data based at least in part on the media expansion characteristics comprises instructions to:
   determine media expansion at the respective plane based at least in part on the media expansion characteristics; and
   add at least one pixel to the respective plane of digital image data based at least in part on the media expansion at the respective plane to thereby increase a size of the respective plane of digital image data.

4. The non-transitory machine-readable storage medium of claim 1, wherein the instructions to adjust the respective plane of digital image data based at least in part on the media expansion characteristics comprises instructions to:
   determine media expansion associated with another plane of digital image data of the plurality of based at least in part on the media expansion characteristics; and
   remove at least one pixel from the respective plane of digital image data based at least in part on the media expansion associated with another plane of digital image data to thereby decrease a size of the respective plane of digital image data.

5. The non-transitory machine-readable storage medium of claim 1, wherein the instructions to adjust the respective plane of digital image data based at least in part on the media expansion characteristics comprises instructions to:
   determine media expansion at the respective plane based at least in part on the media expansion characteristics; and
   increase a pixel size of pixels of the respective plane of digital image data to thereby increase a size of the respective plane of digital image data.

6. The non-transitory machine-readable storage medium of claim 1, wherein the instructions to adjust the respective plane of digital image data based at least in part on the media expansion characteristics comprises instructions to:
   determine media expansion associated with another plane of digital image data of the plurality of based at least in part on the media expansion characteristics; and
   decrease a pixel size of pixels of the respective plane of digital image data to thereby decrease a size of the respective plane of digital image data.

7. The non-transitory machine-readable storage medium of claim 1, wherein printing of at least a portion of each plane of digital image data of the plurality is performed sequentially, and the respective plane of digital image data is adjusted based at least in part on the media expansion characteristics to thereby compensate for media expansion corresponding to printing of at least one other plane of digital image data for which printing is performed prior to printing of the respective plane of digital image data.

8. The non-transitory machine-readable storage medium of claim 1, wherein printing of at least a portion of each plane of digital image data of the plurality is performed sequentially, and the respective plane of digital image data is adjusted based at least in part on the media expansion characteristics to thereby compensate for media expansion corresponding to printing of the respective plane of digital image data for at least one other plane of digital image data for which printing is performed after printing of the respective plane of digital image data.

9. The non-transitory machine-readable storage medium of claim 1, wherein the media expansion characteristics are determined based at least in part on a print speed associated with a printing device, media characteristics, a type of printing material, or any combination thereof.

10. A printing device comprising:
a printing material engine to, prior to printing the print content, determine an amount of printing material associated with printing of at least one plane of image data of a plurality of planes of image data associated with print content;
an expansion characterization engine to, prior to printing any of the print content, determine media expansion characteristics for the print content based at least in part on the plurality of planes of image data and the amount of printing material associated with printing of at least one plane of image data of the plurality;
a plane adjust engine to, prior to printing the print content, adjust a respective plane of image data of the plurality based at least in part on the media expansion characteristics;
a nozzle convert engine to convert the plurality of planes of image data into nozzle data; and
a print engine to control nozzles of a printhead based on the nozzle data to thereby print media-expansion compensated print content.

11. The printing device of claim 10, further comprising:
an alignment measurement device;
a calibration engine to:
control the alignment measurement device to receive printing measurement data therefrom; and
analyze the printing measurement data to determine an amount of misalignment for the printing device,
wherein the expansion characterization engine determines the media expansion characteristics based at least in part on the amount of misalignment.

12. The printing device of claim 10, further comprising:
a first printhead corresponding to a first primary color associated with the printing device;
a second printhead corresponding to a second primary color associated with the printing device;
a third printhead corresponding to a third primary color associated with the printing device,
wherein the plurality of planes of image data comprise a first plane of image data corresponding to the first primary color and having a first print order, a second plane of image data corresponding to the second primary color and having a second print order, a third plane of image data corresponding to the third primary color and having a third print order, and a fourth plane of image data corresponding to the fourth primary color and having a fourth print order,
wherein the plane adjust engine to adjust the respective plane of image data based at least in part on the media expansion characteristic comprises the plane adjust engine to:
determine a first media expansion associated with the second plane of image data corresponding to a first amount of printing material associated with printing of the first plane of image data;
determine a second media expansion associated with the third plane of image data corresponding to the first amount of printing material and a second amount of printing material associated with printing of the second plane of image data;
determine a third media expansion associated with the fourth plane of image data corresponding to the first amount of printing material, the second amount of printing material, and a third amount of printing material associated with printing of the third plane of image data; and
adjust at least a subset of the plurality of planes of image data based on the first media expansion, second media expansion, and third media expansion to thereby compensate for expansion of media during printing of the print content.

13. A method comprising:
receiving print content;
converting, with at least one processing resource, the print content into a plurality of planes of image data for which printing is performed sequentially;
prior to printing any of the print content, analyzing each of the plurality of planes of image data to determine media expansion characteristics for the print content based at least in part on media characteristics, a printing order of each plane of image data of the plurality, and an amount of printing material associated with printing of each plane of image data;
adjusting a respective plane of image data of the plurality of planes based at least in part on the media expansion characteristics to thereby compensate for expansion of media during sequential printing of the planes of image data; and
converting the plurality of planes of image data, including the adjusted respective plane of image data, to nozzle data.

14. The method of claim 13, wherein the plurality of planes of image data comprises a first plane of image data having a first printing order, a second plane of image data having a second printing order, and a third plane of image data having a third printing order,
wherein adjusting the respective plane of image data comprises adjusting the second plane of image data based at least in part on a first amount of printing material associated with the first plane of image data, and
wherein adjusting the respective plane of image data comprises adjusting the third plane of image data based at least in part on the first amount of printing material and a second amount of printing material associated with printing the second plane of image data.

15. The method of claim 13, wherein the plurality of planes of image data comprises a first plane of image data having a first print order, a second plane of image data having a second print order, and a third plane of image data having a third print order,
wherein adjusting the respective plane of image data comprises adjusting the first plane of image data based at least in part on an amount of printing material associated with printing the first plane of image data, and
wherein adjusting the respective plane of image data comprises adjusting the second plane of image data based at least in part on the first amount of printing material and a second amount of printing material associated with printing the second plane of image data.

16. The non-transitory machine-readable storage medium of claim 1, wherein adjusting a respective plane of digital image data of the plurality of planes of digital image data based at least in part on the media expansion characteristics to thereby compensate for media expansion during printing of the print content comprises converting the print content for the particular plane with different settings.

17. The non-transitory machine-readable storage medium of claim 1, wherein the media expansion characteristics are determined based at least in part on a print speed associated with a printing device.

18. The non-transitory machine-readable storage medium of claim 1, wherein the media expansion characteristics are determined based at least in part on a type of printing material.

19. The method of claim 13, wherein adjusting a respective plane of image data of the plurality planes based at least in part on the media expansion characteristics to thereby compensate for expansion of media during sequential printing of the planes of image data comprises adjusting a dot size.

20. The method of claim 13, wherein adjusting a respective plane of image data of the plurality of planes based at least in part on the media expansion characteristics to thereby compensate for expansion of media during sequential printing of the planes of image data comprises adjusting a number of dots per inch.

\* \* \* \* \*